(12) United States Patent
Lindoff et al.

(10) Patent No.: US 11,552,835 B2
(45) Date of Patent: Jan. 10, 2023

(54) ALLOCATION-BASED DISTORTION FUNCTION SELECTION

(71) Applicant: Telefonaktiebolaget LM Ericsson (publ), Stockholm (SE)

(72) Inventors: Bengt Lindoff, Bjärred (SE); Shehzad Ali Ashraf, Aachen (DE); Robert Baldemair, Solna (SE); Lars Sundström, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 477 days.

(21) Appl. No.: 16/300,429

(22) PCT Filed: Oct. 13, 2016

(86) PCT No.: PCT/EP2016/074608
§ 371 (c)(1),
(2) Date: Nov. 9, 2018

(87) PCT Pub. No.: WO2017/194179
PCT Pub. Date: Nov. 16, 2017

(65) Prior Publication Data
US 2019/0165980 A1    May 30, 2019

Related U.S. Application Data

(60) Provisional application No. 62/336,230, filed on May 13, 2016.

(51) Int. Cl.
*H04L 27/26* (2006.01)
*H04L 5/00* (2006.01)
(Continued)

(52) U.S. Cl.
CPC ........ *H04L 27/2623* (2013.01); *H04L 1/0003* (2013.01); *H04L 5/0044* (2013.01);
(Continued)

(58) Field of Classification Search
CPC .................. H04L 27/2623; H04L 1/0003
See application file for complete search history.

(56) References Cited

U.S. PATENT DOCUMENTS

| | | | |
|---|---|---|---|
| 8,958,500 B2 * | 2/2015 | Huang | H03G 3/3042 375/297 |
| 9,451,554 B1 * | 9/2016 | Singh | H04W 52/146 |

(Continued)

FOREIGN PATENT DOCUMENTS

| | | |
|---|---|---|
| CN | 102257732 A | 11/2011 |
| CN | 103001913 A | 3/2013 |
| CN | 103929232 A | 7/2014 |

OTHER PUBLICATIONS

Chen, Yen-Chen, et al., "Cross-layer Design for Joint PAPR Reduction and Multi-resolution Resource Assignment", IEEE 69th Vehicular Technology Conference—VTC Spring 2009, Apr. 26-29, 2009, 1-5.

(Continued)

*Primary Examiner* — Zhensheng Zhang
(74) *Attorney, Agent, or Firm* — Murphy, Bilak & Homiller, PLLC

(57) ABSTRACT

A radio transmitter circuit (10) for transmitting signals within an uplink or sidelink frequency band of a cellular communications system is disclosed. It comprises a signal-generation circuit (20) configured to generate a transmission signal to be transmitted, and a radio front-end circuit (30), connected to the signal-generation circuit (20) at an input of the radio front-end circuit (30), for receiving the transmission signal, and configured to be connected to an antenna (40) at an output of the radio front-end circuit and to transmit the transmission signal to a remote node via said antenna (40). The signal-generation circuit (20) is configured to select a distortion function (D1, D2) based on a location of an allocated radio frequency resource, within said uplink or (Continued)

sidelink frequency band, for the transmission signal. Furthermore, the signal-generation circuit (20) is configured to generate an intermediate transmission signal, based on information to be transmitted in the transmission signal. Moreover, the signal-generation circuit (20) is configured to generate the transmission signal by applying the distortion function (D1, D2) to the intermediate transmission signal.

19 Claims, 5 Drawing Sheets

(51) Int. Cl.
  *H04L 1/00* (2006.01)
  *H04W 72/04* (2009.01)
(52) U.S. Cl.
  CPC ..... *H04L 27/2614* (2013.01); *H04W 72/0453* (2013.01); *H04L 5/0007* (2013.01)

(56) References Cited

U.S. PATENT DOCUMENTS

2013/0170441 A1* 7/2013 Sorrentino ............ H04L 5/0048
    370/329
2015/0015328 A1 1/2015 Chang

OTHER PUBLICATIONS

Hussain, Sajjad, et al., "PAPR variations on dynamic spectrum access in Cognitive Radio systems", IEEE Second International Workshop on Cognitive Radio and Advanced Spectrum Management—CogART'09, May 18-20, 2009, 110-115.

Phoomchusak, Pattama, et al., "Smart Adaptive Tone-Reservation for PAPR Reduction Technique with Throughput Constraint for Multi-User OFDMA Systems", 2011 3rd International Congress on Ultra Modern Telecommunications and Control Systems and Workshops (ICUMT), Oct. 5-7, 2011, 1-5.

* cited by examiner

ALLOCATION-BASED DISTORTION FUNCTION SELECTION

BACKGROUND

OFDM in LTE and 5G

In 3GPP (3rd Generation Partnership Program) LTE (Long Term Evolution), the DL (downlink) uses OFDM (Orthogonal Frequency Division Multiplexing), while UL (uplink) and the D2D (Device-to-Device) sidelink uses DFTS-OFDM (Discrete-Fourier-Transform Spread OFDM), sometimes also referred to as SC-FDMA (Single Carrier Frequency Division Multiple Access). The reason DFTS-OFDM was chosen for the UL and sidelink was mainly due to lower Peak to Average Power Ratio (PAPR) for DFTS-OFDM compared with OFDM, reducing the required power back-off of power amplifier and hence, increasing the coverage. DFTS-OFDM uses an FFT (Fast Fourier Transform) as a pre-coder in order to reduce the peak power. However; precoding and the subsequent design limitations introduce significant restriction in the UL scheduling flexibility and the UL design, and also leads to worse link performance, especially in high SINR (signal-to-interference-and-noise ratio) regime. Furthermore, DFTS-OFDM introduces need for FFT precoders and an extra equalizer in the receiver which increases the complexity.

For future 5G (5th Generation) system, e.g., referred to as NR (New Radio) in 3GPP context, one of the proposals is to use OFDM for all links.

Advantages of OFDM in 5G UL

Using OFDM instead of DFTS-OFDM in the UL (and also in sidelinks) comes with several advantages, for instance those listed below:

- Simplified overall system design reducing the need for specific baseband receivers for respective link if different communication links uses different transmission schemes. This will make it possible to reuse baseband receiver design developed for one side of the communication link to another side and to reuse baseband receiver designs across link types.
- Since OFDM comes with no restrictions as pre-coded OFDM, such as DFTS-OFDM, does on the scheduling, therefore it opens up for a more flexible UL scheduling and increases the system capacity possibilities.
- Having the same transmission scheme in both UL and DL makes the whole system design symmetric.
- MIMO is one of the key features in NR and it is expected that even UL MIMO will be widely adopted for mobile broadband usage. OFDM has been shown to give significant advantages over DFTS-OFDM with respect to link as well as system performance and hence, OFDM is preferred in UL for MIMO use cases.

PAPR

Although using OFDM as transmission scheme for NR UL comes with several advantages as described above, yet it suffers with a problem of high PAPR (Peak-to-Average Power Ratio) which has to be catered in NR-capable modems. High PAPR in OFDM system causes power amplifier to operate in non-linear region which contributes to EVM (error vector magnitude) and in-band/out-of-band emissions in the communication system. Therefore, to keep non-linear effects within certain limits, power back-off is commonly used in the power amplifier which reduces the coverage. The other possibility could be to increase the linear region of the power amplifier which in turn, results in larger amplifiers and hence, higher power consumption.

SUMMARY

The inventors have realized that PAPR or CM (Cubic Metric) reduction can be advantageously obtained by some transparent post-processing technique, i.e. applying a distortion function, selected based on an allocation of a radio frequency resource, such as location and/or bandwidth of the radio frequency resource, e.g. within an UL or sidelink band.

According to a first aspect, there is provided a radio transmitter circuit for transmitting signals within an uplink or sidelink frequency band of a cellular communications system. It comprises a signal-generation circuit configured to generate a transmission signal to be transmitted, and a radio front-end circuit, connected to the signal-generation circuit at an input of the radio front-end circuit, for receiving the transmission signal, and configured to be connected to an antenna at an output of the radio front-end circuit and to transmit the transmission signal to a remote node via said antenna. The signal-generation circuit is configured to select a distortion function based on a location of an allocated radio frequency resource, within said uplink or sidelink frequency band, for the transmission signal. Furthermore, the signal-generation circuit is configured to generate an intermediate transmission signal, based on information to be transmitted in the transmission signal. Moreover, the signal-generation circuit is configured to generate the transmission signal by applying the distortion function to the intermediate transmission signal.

The signal-generation circuit may be configured to select the distortion function based on a bandwidth of the allocated radio-frequency resource.

The signal-generation circuit may be configured to select the distortion function based on a coding and modulation format of the transmission signal.

The signal to be transmitted may be an OFDM signal.

As non-limiting examples, the distortion function may be one of a companding function, a clipping function, and a peak-canceling filtering function.

The signal-generation circuit may be configured to select a first distortion function if the allocated radio frequency resource is in a first sub band of the uplink or sidelink frequency band, and select a second distortion function if the allocated radio frequency resource is in a second sub band of the uplink or sidelink frequency band, wherein the first and second sub bands are different, and the second sub band is located closer to an edge of the uplink or sidelink frequency band than the first sub band. For example, the first sub band may be located in the center of the uplink or sidelink frequency band.

The signal generation circuit may be configured to receive information indicating the location of the allocated radio frequency resource from a network node of the cellular communications system.

The signal generation circuit may be a digital signal processor.

According to a second aspect, there is provided a method of operating a radio transmitter circuit for transmitting signals within an uplink or sidelink frequency band of a cellular communications system. The method comprises selecting a distortion function based on a location of an allocated radio frequency resource, within said uplink or sidelink frequency band, for a transmission signal to be transmitted. Furthermore, the method comprises generating an intermediate transmission signal, based on information to be transmitted in the transmission signal. Moreover, the method comprises generating the transmission signal by applying the distortion function to the intermediate transmission signal. The method also comprises transmitting the transmission signal to a remote node via an antenna.

Selecting the distortion function may comprise selecting the distortion function based on a bandwidth of the allocated radio-frequency resource.

Selecting the distortion function may comprise selecting the distortion function based on a coding and modulation format of the transmission signal.

The signal to be transmitted may be an OFDM signal.

As non-limiting examples, the distortion function may be one of a companding function, a clipping function, and a peak-canceling filtering function.

Selecting the distortion function may comprise selecting a first distortion function if the allocated radio frequency resource is in a first sub band of the uplink or sidelink frequency band, and selecting a second distortion function if the allocated radio frequency resource is in a second sub band of the uplink or sidelink frequency band, wherein the first and second sub bands are different and the second sub band is located closer to an edge of the uplink or sidelink frequency band than the first sub band. For example, The first sub band may be located in the center of the uplink or sidelink frequency band.

The method may comprise receiving information indicating the location of the allocated radio frequency from a network node of the cellular communications system.

According to a third aspect, there is provided a wireless communication device configured to operate within a cellular communications system. The wireless communication device comprises the radio transmitter circuit according to the first aspect. It also comprises said antenna. The output of the radio front-end circuit of the radio transmitter circuit is connected to said antenna. The wireless communication device may e.g. be a mobile phone.

It should be emphasized that the term "comprises/comprising" when used in this disclosure is taken to specify the presence of stated features, integers, steps, or components, but does not preclude the presence or addition of one or more other features, integers, steps, components, or groups thereof.

DETAILED DESCRIPTION

Figure 1:
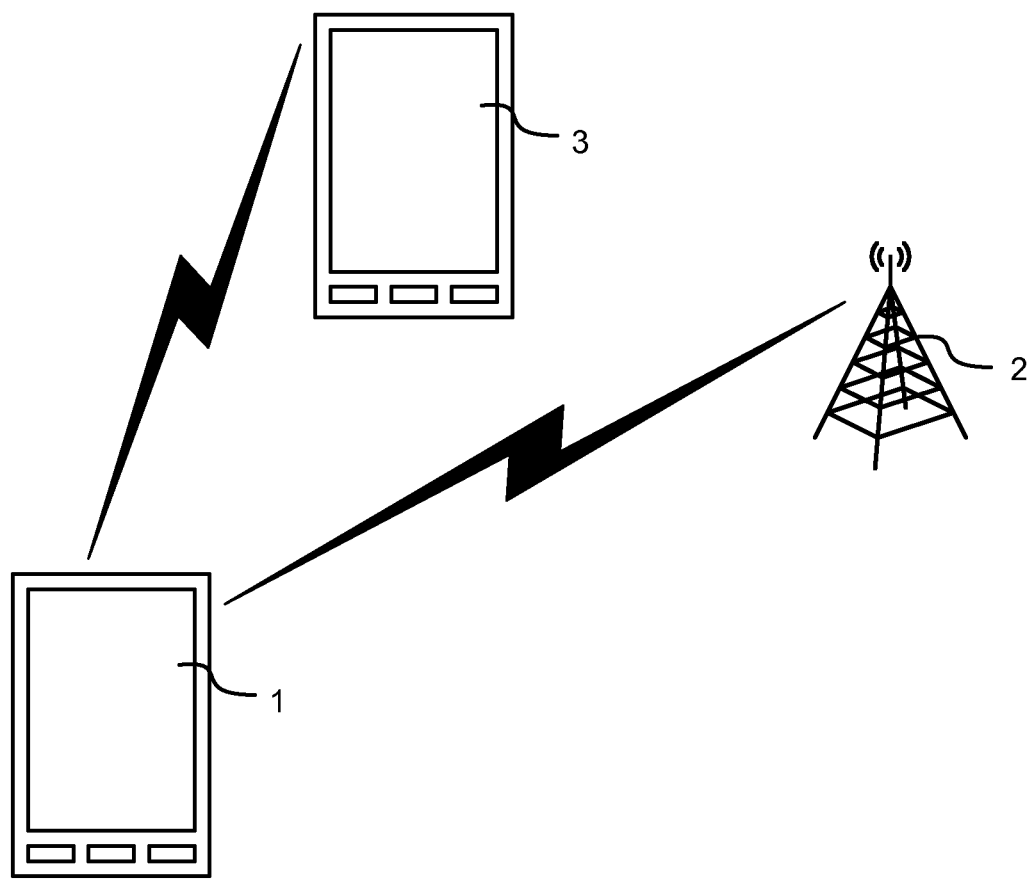
FIG. 1 illustrates a communication environment.

FIG. 1 illustrates a communication environment in which embodiments of the present disclosure can be applied. A wireless communication device 1, configured to operate within a cellular communications system, is in wireless communication with a network node 2, such as a radio base station, of the cellular communications system. As illustrated in FIG. 1, the wireless communication device 1 may, in some embodiments, be configured to perform D2D communication with another wireless communication device 3 in a sidelink band. The wireless communication device 1 (and 3) may e.g. be a mobile phone, or other device commonly referred to in the 3GPP standards as a UE (user equipment).

Figure 2:
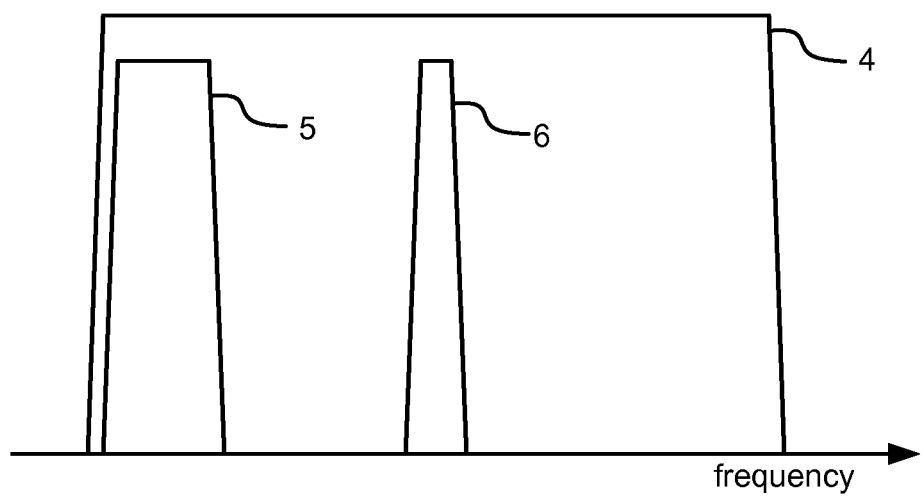
FIG. 2 illustrates frequency bands.

FIG. 2 illustrates frequency bands of the cellular communications system. Reference numeral 4 refers to a total frequency band, within which the wireless communication device may be allocated frequency resources for transmitting signals. Frequency band 4 may thus be a UL band. Alternatively, the band 4 may be a sidelink band. In some embodiments, the UL band is used as a sidelink band also. In some embodiments, wherein time-division duplexing is employed, the UL band may coincide with a DL (downlink) band. In the remainder of this disclosure, it is assumed, as an example, that the wireless communication device 1 should perform UL transmission and that the band 4 is a UL band of the cellular communications system. However, the same considerations apply for D2D transmissions in a sidelink band, and embodiments of the disclosure are applicable also for that scenario. Hence, in the text below, the term "UL band" may be replaced with "sidelink band" to obtain other embodiments of the disclosure.

The wireless communication device 1 may be dynamically allocated frequency resources for transmission. At different time instants, the allocated frequency resources may be located in different frequency sub bands within the UL band 4. They may also have different bandwidths. FIG. 2 illustrates two such sub bands, referred to with reference numerals 5 and 6.

In the literature, one can find several PAPR or CM (cubic metric) mitigation techniques. In short, one can divide the methods in two general categories; distortionless techniques which may include the techniques like
  Selective mapping (SLM), wherein pre-coding methods like SC-FDMA are included
  Partial transmit sequence (PTS)
  Interleaving
  Suitable coding
  Tone reservation (TR)
  and distortion techniques which may include the following techniques
  Amplitude clipping and filtering
  Companding
  Peak cancellation (PC)
  Tone injection (TI)
  Active constellation extension (ACE)

There are many factors which must be considered while choosing an appropriate PAPR/CM reduction technique. Among those are PAPR/CM reduction capability, implementation complexity, transparency between transmitter and receiver sides, processing delay, and link performance degradation. Some of the above mentioned techniques require implementation of multiple FFTs and/or transmission of side information to the receiver which might not be very desirable in some of the NR use-cases.

A specific feature in LTE and 5G OFDM system, such as NR, is that there is a frequency domain allocation aspect on the scheduling, as illustrated in FIG. 2, in the sense that different wireless communication devices 1, 3 may be allocated different amount of frequency resources (resource blocks in LTE). There are different emission requirements on in-band emissions (i.e. emission due to non-linarites (for instance distortion due to PAPR reduction) on non-allocated resource blocks and out-of-band requirements (i.e. on frequency resources outside the allocated system bandwidth). The inventors have realized that PAPR/CM reduction can be advantageously obtained in such a situation by selecting a distortion function based on a location of an allocated radio frequency resource, within the UL band, as further elaborated below. The overall bandwidth of the allocated radio frequency resource may also be used as a basis for the selection of the distortion function, as is further elaborated below.

In order to reduce the PAPR/CM for the transmitted signal different distortion methods can be applied for reducing these metrics. However, introducing distortion of the transmitted signal give impact on both accuracy (EVM) of the transmitted signal as well as interference on non-transmitted frequencies due to the non-linearity introduced. However, depending on the resource allocation for the transmission, the signal can be more or less distorted before violating allowed tolerances in signal accuracy and spurious/intermodulation emissions. For instance, in LTE in-band emission, on non-allocated resources block, may have one requirement, while out-of-band emission may have another requirement. The latter is typically tougher to meet. Therefore, the inventors have realized that once the wireless communication device knows the resource allocation to transmit information on, different distortion function may be applied, giving more or less distortion and different distortion partitioning over frequency. Some frequency resource allocations may generate more spurious in-band emissions, whereas other frequency resource allocations may generate more out-of-band emissions, e.g. depending on how close they are to the edge of the UL band. Hence, tailored PA efficiency on per-RB-allocation-basis can be achieved, which in turn facilitates an overall improved PA efficiency compared with if the same PAPR reduction distortion function were used regardless of frequency allocation. As an example, in FIG. 2, two different RB allocations are shown, a wide allocation (in sub band 5) near the UL band edge, and a narrow allocation (in sub band 6) close to the center of the UL band 4. For a given distortion function selected for PAPR/CM reduction, the frequency allocation in sub band 5 would typically generate more out-of-band distortion than the frequency allocation in sub band 6. Since out-of-band emissions requirements typically are tougher than in-band emission requirements, a more aggressive distortion function may typically be used for the frequency allocation in sub band 6 than for the frequency allocation in sub band 5, while still fulfilling in-band and out-of band emission requirements.

Figure 3:
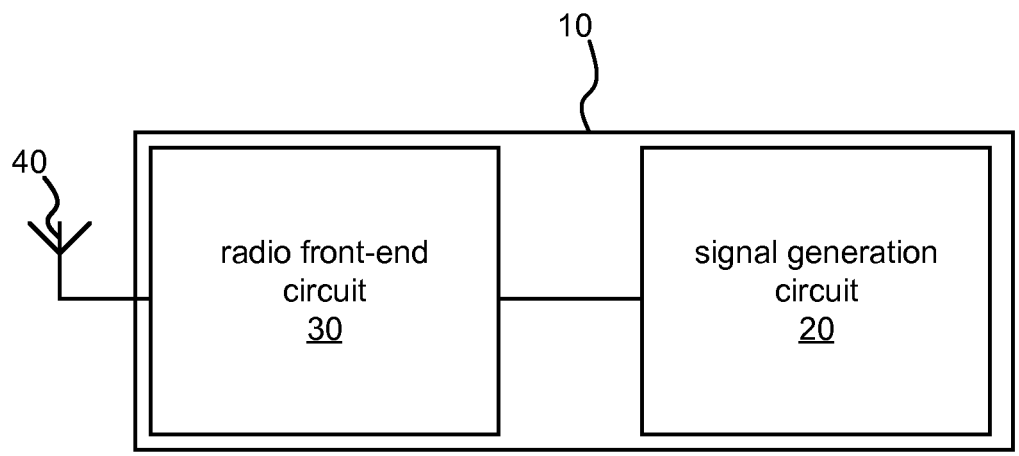
FIG. 3 is a block diagram.

FIG. 3 is a block diagram of a radio transmitter circuit 10 for transmitting signals within the UL frequency band of the cellular communications system in accordance with embodiments of the present disclosure. The radio transmitter circuit 10 may be comprised in the wireless communication device 1. In FIG. 3, the radio transmitter circuit 10 comprises a signal-generation circuit 20 configured to generate a transmission signal to be transmitted. Furthermore, in FIG. 3, the radio transmitter circuit 10 comprises a radio front-end circuit 30, connected to the signal-generation circuit 20 at an input of the radio front-end circuit 30, for receiving the transmission signal, and configured to be connected to an antenna 40, e.g. comprised in the wireless communication device 1, at an output of the radio front-end circuit 30. Furthermore, the radio front-end circuit 30 is configured to transmit the transmission signal to a remote node, such as network node 2 or wireless communication device 3, via said antenna 40. The radio front-end circuit 30 may e.g. comprise filters, buffer amplifiers, mixers, PAs etc for transmitting the transmission signal. Design of such radio front-end circuits 30 is well known in the art of RF transmitter design and is not further described herein. It should be noted that the signal transmitted by the radio front-end circuit 30 is an RF signal in the UL band, whereas the transmission signal generated by the signal generation circuit 20 may be a baseband signal. Hence, in this disclosure, transmitting the transmission signal, by the radio front-end circuit 30, may include frequency up-conversion to the UL band, as well as various filtering and amplification operations, etc.

In line with what is described above, the signal-generation circuit 20 is configured to select a distortion function based on a location of an allocated radio frequency resource, within said UL band, for the transmission signal. Furthermore, the signal-generation circuit 20 is configured to generate an intermediate transmission signal, based on information to be transmitted in the transmission signal. The intermediate transmission signal can be viewed as an ideal transmission signal, which could be transmitted with an ideal PA without clipping and other non-idealities. Moreover, the signal generation circuit 20 is configured to generate the transmission signal by applying the distortion function to the intermediate transmission signal. Thereby, PAPR/CM reduction may be obtained.

Figure 4:
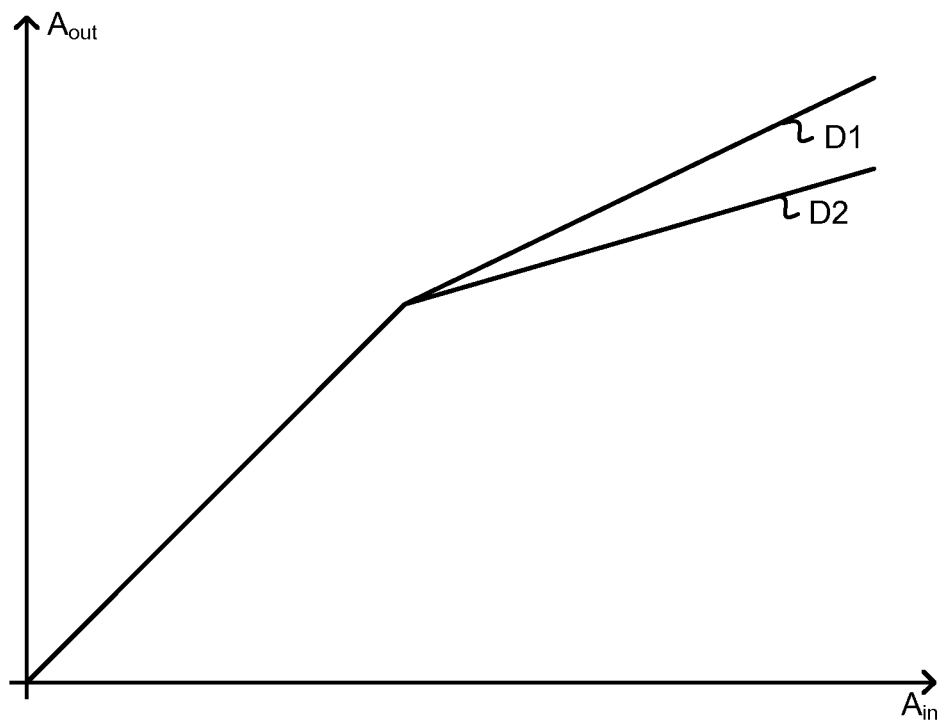
FIG. 4 illustrates distortion functions.

FIG. 4 illustrates examples of two different distortion functions D1 and D2. FIG. 4 illustrates how an input amplitude $A_{in}$ (of the intermediate transmission signal) is mapped on an output amplitude $A_{out}$ (of the transmission signal). The type of distortion function illustrated in FIG. 4 is generally referred to as companding. The companding function D2 is more aggressive than the companding function D1, and therefore generates more distortion. Referring to FIG. 2, the companding function D2 could be applied to the frequency resource allocation in sub band 6, whereas the less aggressive companding function D1 could be applied to the frequency resource allocation in sub band 5, which is more limited by the tougher out-of-band emission requirements than the frequency allocation in sub band 6.

As mentioned above, the transmission signal to be transmitted may be an OFDM signal.

In some embodiments, the distortion function may be one of a companding function, as illustrated in FIG. 4, a clipping function, and a peak-canceling filtering function. To select the distortion function may, in some embodiments, include to select a type of distortion function, e.g. companding, clipping, or peak-canceling filtering. In some embodiments, to select the distortion function may include selecting a parameter of given type of distortion function. The parameter may determine the transfer function of the given type of distortion function. This is the case in the example of FIG. 4, where the given type of distortion function is companding, and the parameter is a parameter determining the steepness of the rightmost part of companding curve. In some embodiments, to select the distortion function may include both selection of type of distortion function and a parameter of the selected distortion function. The use of the term "a parameter" is intended to include also embodiments where two or more parameters are selected.

According to some embodiments, the bandwidth of the allocated radio-frequency resource may be taken into account when selecting the distortion function. For example, with reference to FIG. 2, imagine that the sub band 5 would also be located in the center of the UL band 4. Since the bandwidth of the sub band 5 is wider than the bandwidth of the sub band 6, it may happen that the same distortion function used for sub band 6 does not fulfill the EVM in-band and out-of-band requirements applied on the wider bandwidth sub band 5. For instance, the out-of-band emissions with large bandwidth allocation can be higher (using a given distortion function) and hence, a less aggressive distortion function might be selected than for a narrower bandwidth at the same frequency location. Accordingly, in some embodiments, the signal-generation circuit 20 is configured to select the distortion function based on the bandwidth of the allocated radio-frequency resource.

In some embodiments, the coding and modulation format of the transmission signal may be taken into account when selecting the distortion function. For example, the EVM requirement of 16-QAM (Quadrature Amplitude Modulation) is different than for QPSK (Quadrature Phase-Shift Keying) modulation. Hence, a different distortion function may be selected for a given radio frequency resource allocation using 16 QAM than for the same radio frequency resource allocation using QPSK. Accordingly, in some embodiments, the signal-generation circuit 20 is configured to select the distortion function based on a coding and modulation format of the transmission signal.

In line with the discussion above referring to FIGS. 2 and 4, the signal-generation circuit may be configured to select a first distortion function if the allocated radio frequency resource is in a first sub band, e.g. 6, of the UL band, and select a second, different, distortion function if the allocated radio frequency resource is in a second sub band, e.g. 5, different from the first sub band, of the UL band. As in FIG. 4, the second sub band may be located closer to an edge of the UL band than the first sub band. As in FIG. 4, the first sub band may be located in the center of the UL band.

The signal generation circuit 20 may be configured to receive information indicating the location of the allocated radio frequency resource from a network node, e.g. 2, of the cellular communications system. This may e.g. be done via standardized control signaling of the cellular communications system, and is not further discussed herein. For instance, in an LTE system, the control signaling may include information on what resource blocks are allocated for transmission in the UL. The information may also indicate other information, such as bandwidth and/or modulation and coding format discussed above.

Figure 5:
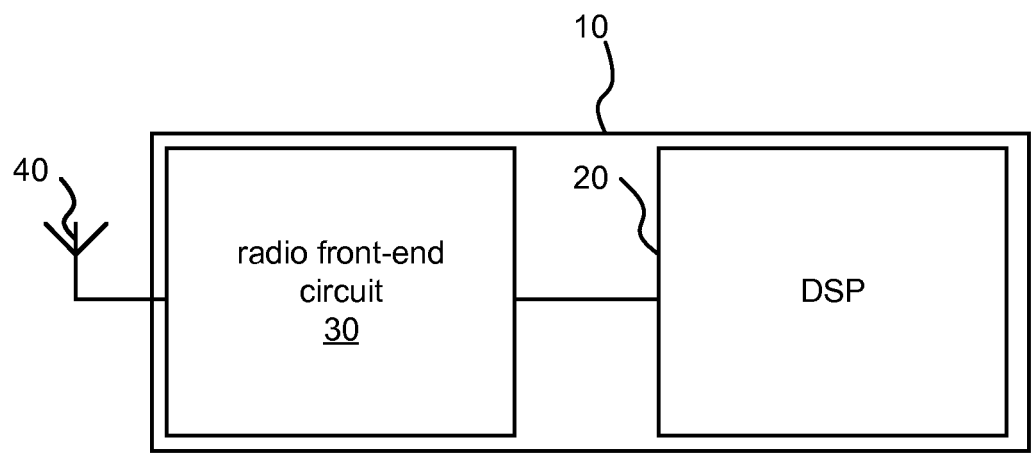
FIGS. 5-6 are block diagrams.

FIG. 5 illustrates an embodiment wherein the signal generation circuit is implemented with a circuit is a digital signal processor (DSP), such as a baseband processor.

Figure 6:
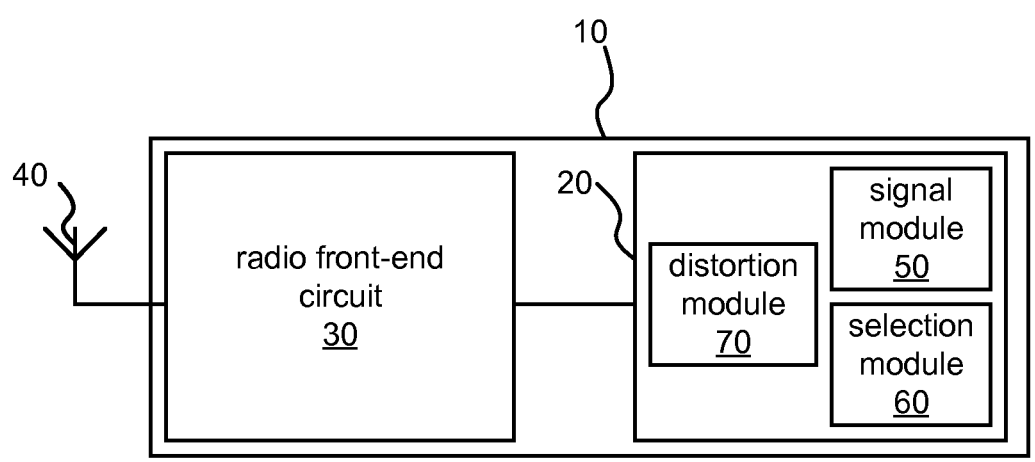

FIG. 6 illustrates an embodiment of the radio transmitter circuit 10. In this embodiment, the the signal-generation circuit 20 comprises a signal module 50 configured to generate the intermediate transmission signal, based on information to be transmitted in the transmission signal. Furthermore, the signal generation circuit 20 comprises a selection module 60 configured to select a distortion function based on a location of an allocated radio frequency resource, within said UL band, for the transmission signal. In some embodiments, the selection module may be configured to also take the bandwidth or the modulation and coding format into account as discussed above. Moreover, the signal generation circuit 20 comprises a distortion module 70 configured to generate the transmission signal by applying the distortion function to the intermediate transmission signal.

Figure 7:
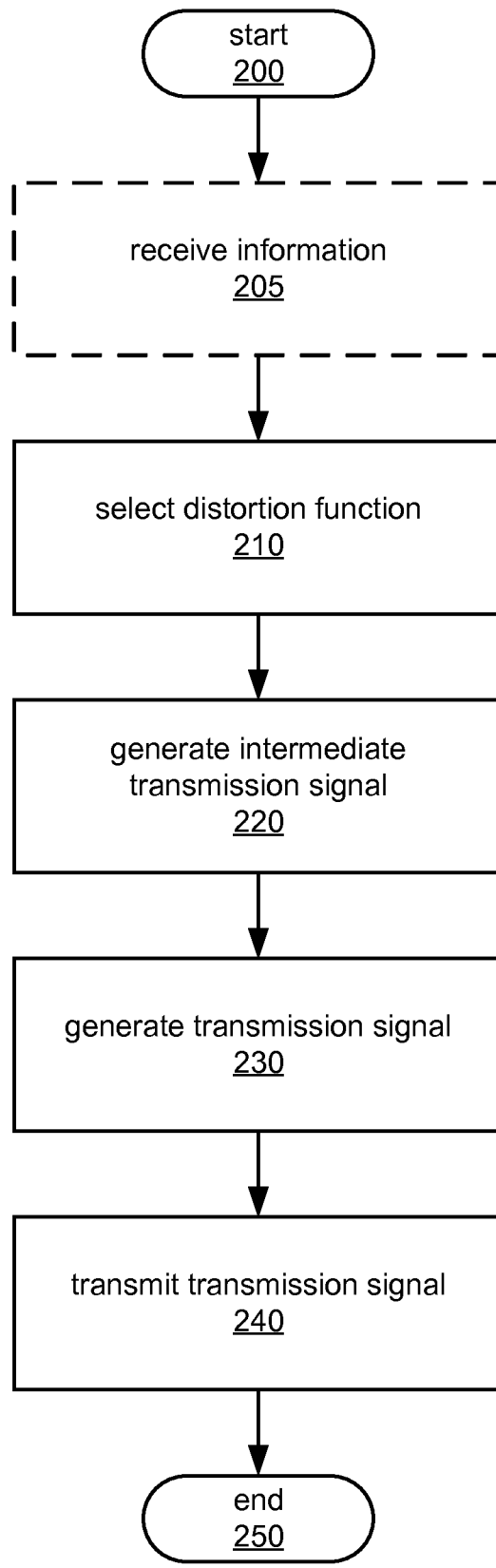
FIG. 7 is a flow chart.

According to some embodiments, there is provided a method of operating a radio transmitter circuit, such as the radio transmitter circuit 10, for transmitting signals within a UL band of a cellular communications system. A flowchart for such a method is illustrated in FIG. 7. In FIG. 7, the operation is started in step 200. In step 210, a distortion function is selected based on a location of an allocated radio frequency resource, within said UL band, for a transmission signal to be transmitted. In step 220, an intermediate transmission signal is generated, based on information to be transmitted in the transmission signal. In step 230, the transmission signal is generated by applying the distortion function to the intermediate transmission signal. In step 240, the transmission signal is transmitted to a remote node (e.g. network node 2 or wireless communication device 3) via an antenna (e.g 40). The operation is then ended in step 250. The method may be repeated as necessary, e.g. for each transmission to be made by the wireless communication device 1.

As above, according to some embodiments, the bandwidth of the allocated radio-frequency resource may be taken into account when selecting the distortion function. Accordingly, in some embodiments, the step 210 of selecting the distortion function comprises selecting the distortion function based on a bandwidth of the allocated radio-frequency resource.

Furthermore, as above, according to some embodiments, the coding and modulation format of the transmission signal may be taken into account when selecting the distortion function. Accordingly, in some embodiments, the step 210 of selecting the distortion function comprises selecting the distortion function based on a coding and modulation format of the transmission signal.

In line with the discussion above referring to FIGS. 2 and 4, selecting 210 the distortion function may comprise selecting a first distortion function if the allocated radio frequency resource is in a first sub band, e.g. 6, of the UL band, and selecting a second distortion function if the allocated radio frequency resource is in a second sub band, e.g. 5, different from the first sub band, of the UL band. As in FIG. 4, the second sub band may be located closer to an edge of the UL band than the first sub band. As in FIG. 4, the first sub band may be located in the center of the UL band.

As illustrated in FIG. 7, the method may optionally comprise receiving 205 information indicating the location of the allocated radio frequency from a network node, e.g. 2, of the cellular communications system. The information may be obtained by reading and detecting scheduling grant (SG) information from the network node, informing the wireless communication device about f/t (frequency/time) resources to use for transmission of data to the remote node. The SG may also include information about modulation and coding to use, and also, in some embodiments, information about allowed TX (transmission) power. In some other embodiment, the obtaining of information is made by reading a broadcast message transmitted on a broadcast channel, giving information about resource to use for transmission. The latter example may be suitable for random access transmissions. The disclosure is not limited to such examples. In some embodiments, the distortion function may be selected also based on one or more of the TX power, used modulation and coding. As mentioned above, examples of distortion functions may be, but is not limited to Clipping functions Companding functions Peak cancelling filters In some OFDM embodiments, the information to be transmitted is coded and modulated, and respective modulated symbols are allocated to allocated sub-carriers. An IFFT is performed, and in some embodiment, a Cyclic Prefix added, to generate the intermediate transmission signal. In some embodiments, an up sampling operation may be involved in the generation of the intermediate transmission signal. Generation of OFDM signals in general is well known and not further discussed herein.

Suitable distortion functions for various different allocations of frequency resources may e.g. be derived based on simulations and/or measurements, taking into account the obtained in-band and out-of band spurious emissions obtained for a given frequency resource allocation and distortion function. The derived suitable distortion functions may be stored in a look-up table (not shown) and selected by the signal generation circuit 20 by means of table look up in said look-up table.

Figure 8:
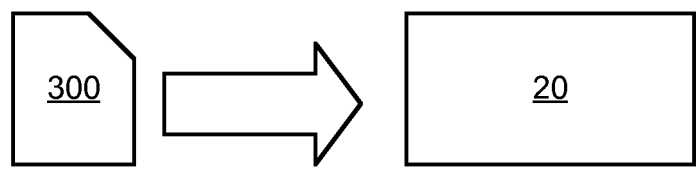
FIG. 8 illustrates a computer-readable medium.

In some embodiments, the signal generation circuit 20 may be implemented as a dedicated application-specific hardware unit. Alternatively, said signal generation circuit 20, or parts thereof, may be implemented with programmable and/or configurable hardware units, such as but not limited to one or more field-programmable gate arrays (FPGAs), processors (such as the DSP in FIG. 5), or microcontrollers. Thus, the signal generation circuit 20 may be a programmable signal generation circuit 20. Hence, embodiments of the present disclosure may be embedded in a computer program product, which enables implementation of the method, or at least some of the steps thereof, such as 205, 210, 220, and/or 230 in FIG. 7, and functions described herein. Therefore, according to embodiments of the present disclosure, there is provided a computer program product, comprising instructions arranged to cause signal generation circuit 20 to perform at least some of the steps of any of the embodiments of said method. The computer program product may comprise program code which is stored on a computer readable medium 300, as illustrated in FIG. 8, which can be loaded and executed by said programmable signal generation circuit, to cause it to perform said steps.

The invention claimed is:

1. A radio transmitter circuit for transmitting signals within an uplink or sidelink frequency band of a cellular communications system, the radio transmitter circuit comprising:
    a signal-generation circuit configured to generate a transmission signal to be transmitted; and
    a radio front-end circuit, connected to the signal-generation circuit at an input of the radio front-end circuit, for receiving the transmission signal, and configured to be connected to an antenna at an output of the radio front-end circuit and to transmit the transmission signal to a remote node via said antenna;
wherein the signal-generation circuit is configured to
    select a distortion function, said selecting the distortion function comprising one or both of:
        selecting from among a plurality of distortion function types based on a location of an allocated radio frequency resource, within said uplink or sidelink frequency band, for the transmission signal, and
        selecting from among a plurality of parameter values for a parameter of a given distortion function type, based on the location of the allocated radio frequency resource, within said uplink or sidelink frequency band, for the transmission signal,
    generate an intermediate transmission signal, based on information to be transmitted in the transmission signal, and
    generate the transmission signal by applying the distortion function to the intermediate transmission signal.

2. The radio transmitter circuit of claim 1, wherein the signal-generation circuit is configured to select the distortion function based on a bandwidth of the allocated radio-frequency resource.

3. The radio transmitter circuit of claim 1, wherein the signal-generation circuit is configured to select the distortion function based on a coding and modulation format of the transmission signal.

4. The radio transmitter circuit of claim 1, wherein the signal to be transmitted is an OFDM signal.

5. The radio transmitter circuit of claim 1, wherein the distortion function is one of
    a companding function;
    a clipping function; and
    a peak-canceling filtering function.

6. The radio transmitter circuit of claim 1, wherein the signal-generation circuit is configured to
    select a first distortion function if the allocated radio frequency resource is in a first sub band of the uplink or sidelink frequency band; and
    select a second distortion function if the allocated radio frequency resource is in a second sub band of the uplink or sidelink frequency band;
wherein the first and second sub bands are different and the second sub band is located closer to an edge of the uplink or sidelink frequency band than the first sub band.

7. The radio transmitter circuit of claim 6, wherein the first sub band is located in the center of the uplink or sidelink frequency band.

8. The radio transmitter circuit of claim 1, wherein the signal generation circuit is configured to receive information indicating the location of the allocated radio frequency resource from a network node of the cellular communications system.

9. The radio transmitter circuit of claim 1, wherein the signal generation circuit is a digital signal processor.

10. A wireless communication device configured to operate within a cellular communications system, comprising
    the radio transmitter circuit of claim 1; and
    said antenna;
wherein the output of the radio front-end circuit of the radio transmitter circuit is connected to said antenna.

11. A method of operating a radio transmitter circuit for transmitting signals within an uplink or sidelink frequency band of a cellular communications system, the method comprising:
    selecting a distortion function, said selecting the distortion function comprising one or both of:
        selecting from among a plurality of distortion function types based on a location of an allocated radio frequency resource, within said uplink or sidelink frequency band, for a transmission signal to be transmitted; and
        selecting from among a plurality of parameter values for a parameter of a given distortion function type, based on the location of the allocated radio frequency resource, within said uplink or sidelink frequency band, for the transmission signal;
    generating an intermediate transmission signal, based on information to be transmitted in the transmission signal;
    generating the transmission signal by applying the distortion function to the intermediate transmission signal; and
    transmitting the transmission signal to a remote node via an antenna.

12. The method of claim 11, wherein selecting the distortion function comprises selecting the distortion function based on a bandwidth of the allocated radio-frequency resource.

13. The method of claim 11, wherein selecting the distortion function comprises selecting the distortion function based on a coding and modulation format of the transmission signal.

14. The method of claim 11, wherein the signal to be transmitted is an OFDM signal.

15. The wireless communication device of claim 10, wherein the wireless communication device is a mobile phone.

16. The method of claim 11, wherein the distortion function is one of
   a companding function;
   a clipping function; and
   a peak-canceling filtering function.

17. The method of claim 11, wherein selecting the distortion function comprises:
   selecting a first distortion function if the allocated radio frequency resource is in a first sub band of the uplink or sidelink frequency band; and
   selecting a second distortion function if the allocated radio frequency resource is in a second sub band of the uplink or sidelink frequency band;
wherein the first and second sub bands are different and the second sub band is located closer to an edge of the uplink or sidelink frequency band than the first sub band.

18. The method of claim 17, wherein the first sub band is located in the center of the uplink or sidelink frequency band.

19. The method of claim 11, comprising:
   receiving information indicating the location of the allocated radio frequency from a network node of the cellular communications system.

* * * * *